United States Patent
Rajput et al.

(10) Patent No.: US 11,763,623 B2
(45) Date of Patent: *Sep. 19, 2023

(54) GAMING MACHINE AND METHOD WITH A DYNAMIC SEARCH INTERFACE

(71) Applicant: Aristocrat Technologies Australia Pty Limited, North Ryde (AU)

(72) Inventors: Rajat Rajput, Uttar Pradesh (IN); Sunil Mohan, Uttar Pradesh (IN); Rohit Kumar Jain, Uttar Pradesh (IN)

(73) Assignee: ARISTOCRAT TECHNOLOGIES AUSTRALIA PTY LIMITED, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 17/874,118

(22) Filed: Jul. 26, 2022

(65) Prior Publication Data

US 2022/0358811 A1 Nov. 10, 2022

Related U.S. Application Data

(63) Continuation of application No. 17/002,376, filed on Aug. 25, 2020, now Pat. No. 11,403,909, which is a
(Continued)

(51) Int. Cl.
*G07F 17/32* (2006.01)
*G06F 16/903* (2019.01)
*G06F 16/532* (2019.01)

(52) U.S. Cl.
CPC ........ *G07F 17/3209* (2013.01); *G06F 16/532* (2019.01); *G06F 16/903* (2019.01); *G07F 17/3211* (2013.01)

(58) Field of Classification Search
CPC ............ G07F 17/3209; G07F 17/3211; G06F 16/903; G06F 16/532
See application file for complete search history.

(56) References Cited

U.S. PATENT DOCUMENTS 7,628,691 B2 12/2009 Luciano, Jr.
7,727,064 B1 6/2010 Luciano, Jr.
(Continued)

OTHER PUBLICATIONS

Notice of Allowance dated May 11, 2020 for U.S. Appl. No. 16/135,417 (pp. 1-14).
(Continued)

*Primary Examiner* — Werner G Garner
(74) *Attorney, Agent, or Firm* — Armstrong Teasdale LLP

(57) ABSTRACT

An electronic gaming machine includes a display, a player input device, a credit input mechanism, and a processor programmed to perform operations comprising: (i) display a search pattern matrix to a player on the display, the search pattern matrix includes a plurality of cells that are selectable by the player; (ii) receive an input selection of cells of the search pattern matrix from the player; (iii) search a pay table associated with a wagering game provided by the gaming machine for winning patterns included within the pay table and having at least the same plurality of cells daubed as are indicated by the search pattern matrix; and (iv) display the winning patterns identified by the searching to the player via the display, the displaying including presenting the winning patterns in a matrix display format identifying one or more daubed cells of the associated winning patterns within the matrix display

20 Claims, 8 Drawing Sheets

Related U.S. Application Data continuation of application No. 16/135,417, filed on Sep. 19, 2018, now Pat. No. 10,777,036.

(56) References Cited

U.S. PATENT DOCUMENTS

2004/0082384 A1    4/2004  Walker
2015/0011289 A1    1/2015  Colvin

OTHER PUBLICATIONS

Office Action (Non-Final Rejection) dated Aug. 2, 2021 for U.S. Appl. No. 17/002,376 (pp. 1-12).
Office Action (Final Rejection) dated Jan. 5, 2022 for U.S. Appl. No. 17/002,376 (pp. 1-6).
Office Action (Notice of Allowance and Fees Due (PTOL-85)) dated Mar. 25, 2022 for U.S. Appl. No. 17/002,376 (pp. 1-7).

GAMING MACHINE AND METHOD WITH A DYNAMIC SEARCH INTERFACE

CROSS-REFERENCE TO RELATED APPLICATIONS

The present application is a continuation of, and claims benefit of priority to, U.S. patent application Ser. No. 17/002,376, filed 25 Aug. 2020, and entitled "GAMING MACHINE AND METHOD WITH A DYNAMIC SEARCH INTERFACE," which is a continuation of, and claims benefit of priority to, U.S. patent application Ser. No. 16/135,417, filed 19 Sep. 2018, entitled "GAMING MACHINE AND METHOD WITH A DYNAMIC SEARCH INTERFACE," which are herein incorporated by reference in their entirety.

TECHNICAL FIELD

The field of disclosure relates generally to electronic gaming, and more particularly to an electronic gaming machine and method that provides a dynamic search interface.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to "cash out."

Slot games are often displayed to the player in the form of various symbols arranged in a row-by-column grid, or "matrix." Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a "paytable" that is available to the player for reference. Often, the player may vary his/her wager to include differing numbers of paylines and/or the amount bet on each line. By varying the wager, the player may sometimes alter the frequency or number of winning combinations, the frequency or number of secondary games, and/or the amount awarded.

Bingo games may also be played on electronic gaming machines. In some bingo games, a player receives a bingo card in response to a bingo game wager. A server, possibly after determining that enough players have entered the bingo game, may randomly determine and/or select a set of bingo numbers, and distribute the bingo numbers to the electronic gaming machines in the bingo game. The appropriate cells on the bingo card may be marked (or "daubed") based on the bingo numbers.

Typical games use a random number generator (RNG) to randomly generate elements of the games (e.g., bingo cards, bingo numbers, slot symbol combinations) or to determine the outcome of each game. The game may be designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

BRIEF DESCRIPTION

In one embodiment, an electronic gaming machine is provided. The electronic gaming machine includes a display, a player input device, a credit input mechanism including at least one of a card reader, a ticket reader, a bill acceptor, and a coin input mechanism, wherein the credit input mechanism is configured to receive a credit wager, a storage medium having instructions stored thereon, and a processor. The processor is coupled to the display, the player input device, the credit input mechanism, and the storage medium. When executed, the instructions cause the processor to at least: (i) display a search pattern matrix to a player on the display, the search pattern matrix includes a plurality of cells, each cell of the plurality of cells being selectable by the player; (ii) receive an input selection of one or more cells of the search pattern matrix from the player via the player input device; (iii) search a pay table associated with a wagering game provided by the gaming machine for one or more winning patterns included within the pay table and having at least the same plurality of cells daubed as are indicated by the search pattern matrix; and (iv) display the one or more winning patterns identified by the searching to the player via the display, the displaying including presenting the one or more winning patterns in a matrix display format identifying one or more daubed cells of the associated winning patterns within the matrix display.

In another embodiment, a method of electronic gaming implemented on an electronic gaming machine is provided. The electronic gaming machine includes at least one processor in communication with at least one memory device, a player input device, and a display. The method includes: (i) displaying a search pattern matrix to a player on the display, the search pattern matrix includes a plurality of cells, each cell of the plurality of cells being selectable by the player; (ii) receiving an input selection of one or more cells of the search pattern matrix from the player via the player input device; (iii) searching a pay table associated with a wagering game provided by the gaming machine for one or more winning patterns included within the pay table and having at least the same plurality of cells daubed as are indicated by the search pattern matrix; and (iv) displaying the one or more winning patterns identified by the searching to the player via the display, the displaying including presenting the one or more winning patterns in a matrix display format identifying one or more daubed cells of the associated winning patterns within the matrix display.

In yet another embodiment, a non-transitory computer-readable storage medium having computer-executable instructions embodied thereon is provided. When executed by an electronic gaming machine having at least one processor coupled to at least one memory device, the computer-executable instructions cause the at least one processor to: (i) display a search pattern matrix to a player on the display, the search pattern matrix includes a plurality of cells, each cell of the plurality of cells being selectable by the player; (ii) receive an input selection of one or more cells of the search pattern matrix from the player via the player input device; (iii) search a pay table associated with a wagering game provided by the gaming machine for one or more winning patterns included within the pay table and having at least the same plurality of cells daubed as are indicated by the search pattern matrix; and (iv) display the one or more winning patterns identified by the searching to the player via the display, the displaying including presenting the one or more winning patterns in a matrix display format identifying one or more daubed cells of the associated winning patterns within the matrix display.

BRIEF DESCRIPTION OF THE DRAWINGS

An example embodiment of the subject matter disclosed will now be described with reference to the accompanying drawings.

DETAILED DESCRIPTION

Figure 1:
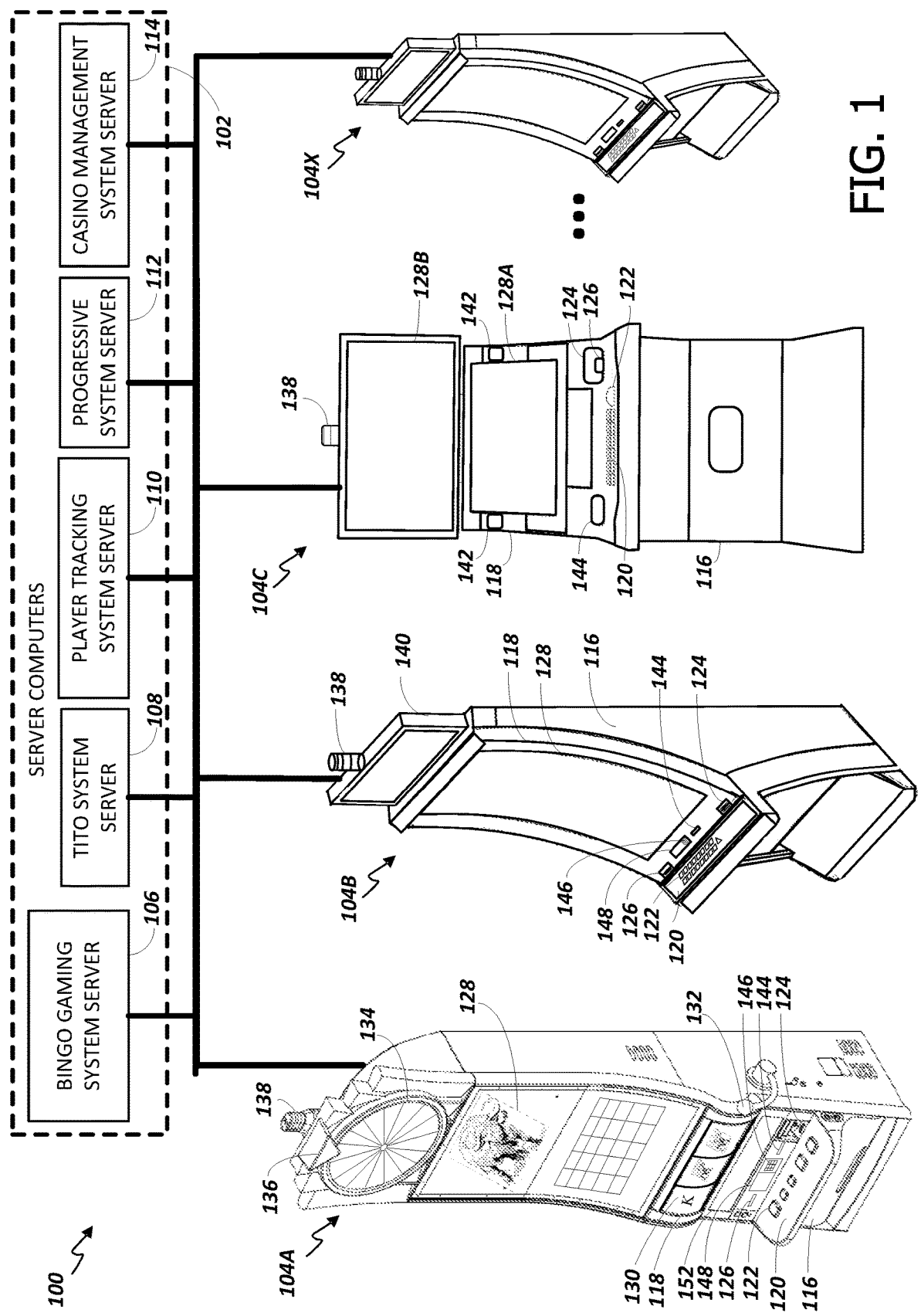
FIG. 1 is a diagram of exemplary EGMs networked with various gaming-related servers.

At least some known wagering games provide a help screen for the player. For example, in certain Class II bingo wagering games, help screens may be provided to players. A player may be able to press a particular button on a button deck of a gaming device to call up a set of help screens during a gaming session. The help screens typically provide rules associated with the wagering game. In Class II bingo gaming, the help screens also typically illustrate to the player various winning patterns (e.g., for bingo cards). The winning patterns help screens may illustrate the winning pattern (e.g., as cells daubed on an otherwise-empty bingo card), as well as provide other information such as a maximum number of balls in which to achieve the winning pattern in order to match the winning pattern, and a credit award for matching the winning pattern. In order to inspect these help screens, the player typically needs to scroll through each pattern one page at a time. It can be difficult for the player to find a particular pattern amongst all of the possible winning patterns. Further, these help screens are typically image files pre-generated for each particular game (e.g., by game developers) and stored on the gaming machine for use during game play. In some games, there may be many hundred winning patterns and, as such, several hundred images are needed to be created. The size of such images can be large, sometimes exceeding 10 Gigabytes for larger games. Further, creation of such static images can be time consuming and tedious for game developers, and if there are errors in the creation of the images, may lead to inconsistencies between the pay table used to determine awards and the help screens shown to the players.

To alleviate such technical problems, an electronic gaming machine is described herein that provides a dynamic search module used to provide help screens for a wagering game, allowing a player to easily locate winning pattern information associated with the wagering game. Further, the dynamic search module automatically constructs help screen information from a pay table used by the gaming machine to determine awards, thereby decreasing local storage requirements on the gaming devices and associated network bandwidth that may otherwise be used to transmit traditional image-based help pages. More specifically, the dynamic search engine constructs help pages from a pay table file (e.g., an Extensible Markup Language (XML) file) that defines the many winning patterns for the wagering game. The dynamic search module provides a graphical user interface (GUI) within the wagering game that allows the player to daub a "search bingo card" to identify a search pattern of interest. The dynamic search modules uses the search pattern to identify one or more winning patterns within the pay table file, dynamically constructs a help screen for each identified winning pattern, and presents the help screen(s) to the player via the GUI, allowing the player to traverse through the help screens and view the identified winning patterns and associated data (e.g., maximum number of balls, credit awards, and so forth).

As used herein, the terms "primary game," "main game," and "base game" may refer to games initiated in response to one of a plurality of game initiation events, such as a wager or credit being received by or transferred to an EGM, as described herein. A primary game may be associated with a primary game outcome represented by a plurality of primary game symbols or primary game reels, each of which may include a plurality of primary game symbols, and each of which may be selected based upon a random number generated by a random number generator.

Further, as used herein, the terms "secondary game," "feature game," and "bonus game" may refer generally to a game or a component of a game involving procedures in addition to the primary game. In some embodiments, a bonus game may be triggered from a primary game and may be associated with a bonus game outcome, which may be different from the primary game outcome. For example, a bonus game may be initiated after, or during, a primary game and in response to the occurrence of a particular condition, such as a "trigger condition" occurring during the primary game. A bonus game may result in a bonus game outcome or bonus award that increases a primary game award or adds a bonus game award to a primary game award.

FIG. 1 is a diagram of exemplary EGMs networked with various gaming-related servers in a gaming system 100. Gaming system 100 operates in a gaming environment, including one or more servers, or server computers, such as slot servers of a casino, that are in communication, via a communications network, with one or more EGMs, or gaming devices 104A-104X, such as EGMs, slot machines, video poker machines, or bingo machines, for example. Gaming devices 104A-104X may, in the alternative, be portable and/or remote gaming devices such as, for example, and without limitation, a smart phone, a tablet, a laptop, or a game console.

Communication between gaming devices 104A-104X and servers 102, and among gaming devices 104A-104X, may be direct or indirect, such as over the Internet through a web site maintained by a computer on a remote server or over an online data network including commercial online service providers, Internet service providers, private networks, and the like. In other embodiments, gaming devices 104A-104X communicate with one another and/or servers 102 over wired or wireless RF or satellite connections and the like.

In certain embodiments, servers 102 may not be necessary and/or preferred. For example, the present invention may, in one or more embodiments, be practiced on a stand-alone gaming device such as gaming device 104A and/or gaming device 104A in communication with only one or more other gaming devices 104B-104X (i.e., without servers 102).

Servers 102 may include a bingo gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, a bingo ball call may be generated on a bingo gaming system server 106 and then transmitted over the network to any of a group of remote terminals or remote gaming devices 104A-104X that utilize the bingo ball call to determine the bingo game outcome and display the result to the player.

Gaming device 104A is often of a cabinet construction that may be aligned in rows or banks of similar devices for placement and operation on a casino floor. The gaming device 104A often includes a main door 116 that provides access to the interior of the cabinet. Gaming device 104A typically includes a button area or button deck 120 accessible by a player that is configured with input switches or buttons 122, a bill validator 124, and/or ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 including a plurality of mechanical reels 130, typically 3 or 5 mechanical reels, with various symbols displayed there on. Reels 130 are then independently spun and stopped to show a set of symbols within the gaming display area 118 that may be used to present an outcome to the game.

In many configurations, gaming machine 104A may have a main display 128 (e.g., video display monitor) mounted to, or above, gaming display area 118. Main display 128 may be, for example, a high-resolution LCD, plasma, LED, or OLED panel that may be flat or curved as shown, a cathode ray tube, or other conventional electronically controlled video monitor.

In certain embodiments, bill validator 124 may also function as a "ticket-in" reader that enables the player to use a casino-issued credit ticket to load credits onto gaming device 104A (e.g., in a cashless TITO system). In such cashless embodiments, gaming device 104A may also include a "ticket-out" printer 126 for outputting a credit ticket when a "cash out" button is pressed. Cashless ticket systems are well known in the art and are used to generate and track unique bar-codes printed on tickets to allow players to avoid the use of bills and coins by loading credits using a ticket reader and cashing out credits using ticket-out printer 126 on gaming device 104A.

In certain embodiments, a player tracking card reader 144, a transceiver for wireless communication with a player's smartphone, a keypad 146, and/or an illuminated display 148 for reading, receiving, entering, and/or displaying player tracking information can be provided. In such embodiments, a game controller within gaming device 104A communicates with player tracking server system 110 to send and receive player tracking information.

Gaming device 104A may also include, in certain embodiments, a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but could also be incorporated into play of the base game, or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

In certain embodiments, there may also be one or more information panels 152 that may be, for example, a back-lit silkscreened glass panel with lettering to indicate general game information including, for example, a game denomination (e.g., $0.25 or $1), pay lines, pay tables, and/or various game related graphics. In some embodiments, information panels 152 may be implemented as an additional video display.

Gaming device 104A traditionally includes a handle 132 typically mounted to the side of main cabinet 116 that may be used to initiate game play.

Figure 2:
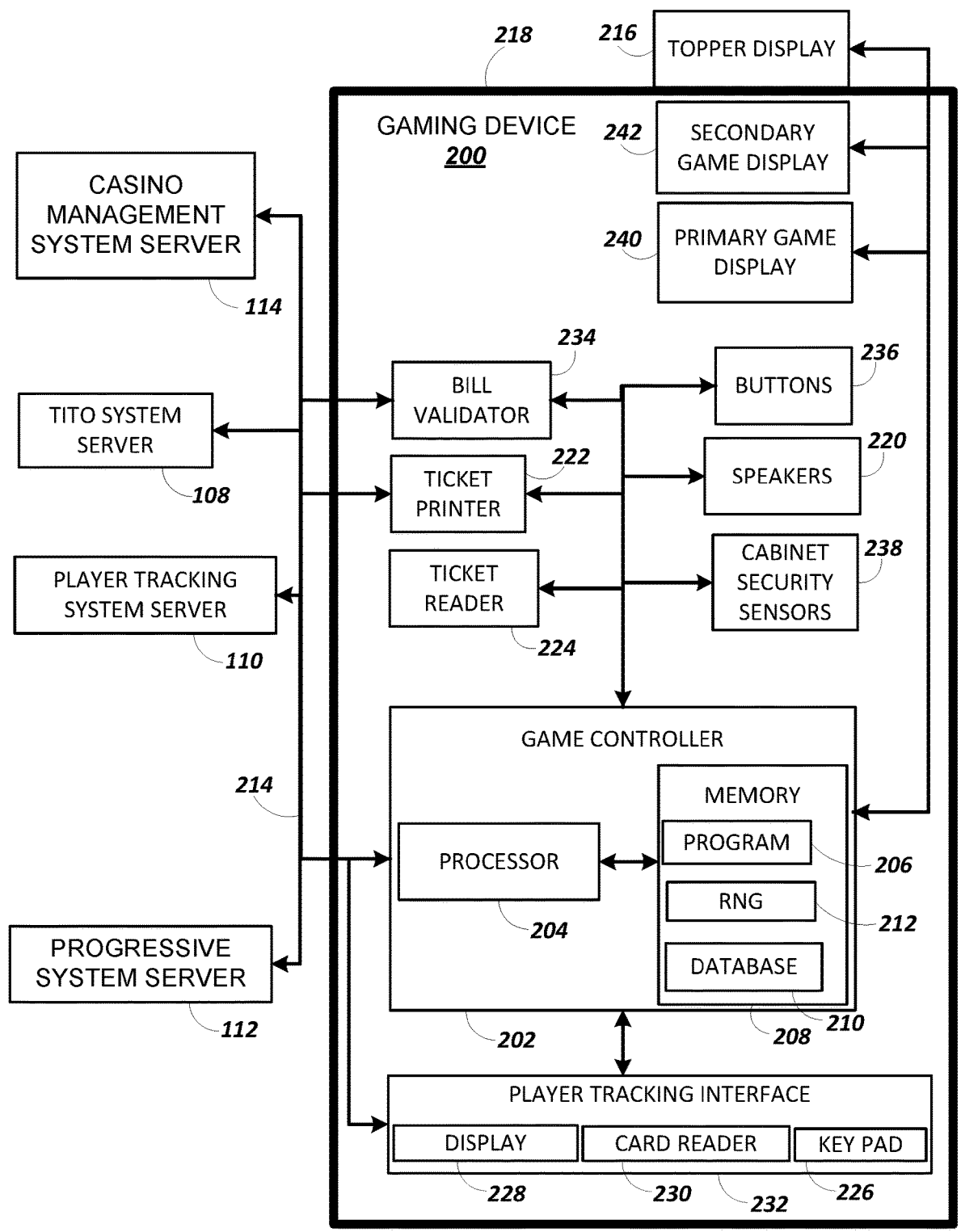
FIG. 2 is a block diagram of an exemplary EGM.

Many or all of the above described components may be controlled by circuitry (e.g., a gaming controller) housed inside main cabinet 116 of gaming device 104A, the details of which are shown in FIG. 2.

Not all gaming devices suitable for implementing embodiments of the gaming systems, gaming devices, or methods described herein necessarily include top wheels, top boxes, information panels, cashless ticket systems, and/or player tracking systems. Further, some suitable gaming devices have only a single game display that includes only a mechanical set of reels and/or a video display, while others are designed, for example, for bar tables or table tops and have displays that face upwards.

Exemplary gaming device 104B shown in FIG. 1 is an Arc™ model gaming device manufactured by Aristocrat® Technologies, Inc. Where possible, reference numeral identifying similar features of gaming device 104A are also identified in gaming device 104B using the same reference numerals. Gaming device 104B, however, does not include physical reels 130 and instead shows game play and related game play functions on main display 128. An optional topper screen 140 may be included as a secondary game display for bonus play, to show game features or attraction activities while the game is not in play, or any other information or media desired by the game designer or operator. In some embodiments, topper screen 140 may also or alternatively be used to display progressive jackpot prizes available to a player during play of gaming device 104B.

Gaming device 104B includes main cabinet 116 having main door 118 that opens to provide access to the interior of gaming device 104B. Main door 118, or service door, is typically used by service personnel to refill ticket-out printer 126 and collect bills and tickets inserted into bill validator 124. Main door 118 may further be accessed to reset the machine, verify and/or upgrade the software, and for general maintenance operations.

Exemplary gaming device 104C shown in FIG. 1 is a Helix™ model gaming device manufactured by Aristocrat® Technologies, Inc. Gaming device 104C includes a main display 128A that is in a landscape orientation. Although not illustrated by the front view illustrated in FIG. 1, landscape display 128A has a curvature radius from top to bottom. In certain embodiments, display 128A is a flat panel display. Main display 128A is typically used for primary game play while a secondary display 128B is used for bonus game play, to show game features or attraction activities while the game is not in play, or any other information or media desired by the game designer or operator.

Many different types of games, including mechanical slot games, video slot games, video poker, video black jack, video pachinko, keno, bingo, and lottery, may be provided with or implemented within gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, Class II, or Class III, etc.

FIG. 2 is a block diagram of an exemplary gaming device 200, or EGM, connected to various external systems, including TITO system server 108, player tracking system server 110, progressive system server 112, and casino management system server 114. All or parts of gaming device 200 may be embodied in game devices 104A-104X shown in FIG. 1. The games conducted on gaming device 200 are controlled by a game controller 202 that includes one or more processors 204 and a memory 208 coupled thereto. Games are represented by game software or a game program 206 stored on memory 208. Memory 208 includes one or more mass storage devices or media housed within gaming device 200. One or more databases 210 may be included in memory 208 for use by game program 206. A random number generator (RNG) 212 is implemented in hardware and/or software and is used, in certain embodiments, to generate random numbers for use in operation of gaming device 200 to conduct game play and to ensure the game play outcomes are random and meet regulations for a game of chance.

Alternatively, a bingo ball call, may be generated on a remote gaming device such as bingo gaming system server 106, shown in FIG. 1. The bingo ball call is communicated to gaming device 200 via a network 214, and is used by gaming device 200 to determine an outcome of a bingo game, which is then displayed on gaming device 200. Gaming device 200 executes game software to enable the game to be displayed on gaming device 200. In certain embodiments, game controller 202 executes video streaming software that enables the game to be displayed on gaming device 200. Game software may be loaded from memory 208, including, for example, a read only memory (ROM), or from bingo gaming system server 106 into memory 208. Memory 208 includes at least one section of ROM, random access memory (RAM), or other form of storage media that stores instructions for execution by processor 204.

Gaming device 200 includes a topper display 216. In an alternative embodiment, gaming device 200 includes another form of a top box such as, for example, a topper wheel, or other topper display that sits on top of main cabinet 218. Main cabinet 218 or topper display 216 may also house various other components that may be used to add features to a game being played on gaming device 200, including speakers 220, a ticket printer 222 that prints bar-coded tickets, a ticket reader 224 that reads bar-coded tickets, and a player tracking interface 232. Player tracking interface 232 may include a keypad 226 for entering player tracking information, a player tracking display 228 for displaying player tracking information (e.g., an illuminated or video display), a card reader 230 for receiving data and/or communicating information to and from media or a device such as a smart phone enabling player tracking. Ticket printer 222 may be used to print tickets for TITO system server 108. Gaming device 200 may further include a bill validator 234, buttons 236 for player input, cabinet security sensors 238 to detect unauthorized opening of main cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered and time of play) for individual players so that an operator may reward players in a loyalty program. The player may use player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by casino management system server 114.

Gaming devices, such as gaming devices 104A-104X and 200, are highly regulated to ensure fairness and, in many cases, gaming devices 104A-104X and 200 are operable to award monetary awards (e.g., typically dispensed in the form of a redeemable voucher). Therefore, to satisfy security and regulatory requirements in a gaming environment, hardware and software architectures are implemented in gaming devices 104A-104X and 200 that differ significantly from those of general-purpose computers. Adapting general purpose computers to function as gaming devices 200 is not simple or straightforward because (1) regulatory requirements for gaming devices, (2) harsh environments in which gaming devices operate, (3) security requirements, and (4) fault tolerance requirements. These differences require substantial engineering effort and often additional hardware.

When a player wishes to play gaming device 200, he/she can insert cash or a ticket voucher through a coin acceptor (not shown) or bill validator 234 to establish a credit balance on the gaming machine. The credit balance is used by the player to place wagers on instances of the game and to receive credit awards based on the outcome of winning instances of the game. The credit balance is decreased by the amount of each wager and increased upon a win. The player can add additional credits to the balance at any time. The player may also optionally insert a loyalty club card into card reader 230. During the game, the player views the game outcome on game displays 240 and 242. Other game and prize information may also be displayed.

For each game instance, a player may make selections that may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using player-input buttons 236, primary game display 240, which may include a touch screen, or using another suitable device that enables a player to input information into gaming device 200.

During certain game events, gaming device 200 may display visual and auditory effects that can be perceived by the player. These effects add to the excitement of a game, which makes a player more likely to continue playing. Auditory effects include various sounds that are projected by speakers 220. Visual effects include flashing lights, strobing lights, or other patterns displayed from lights on gaming device 200 or from lights behind information panel 152, shown in FIG. 1.

When the player wishes to stop playing, he/she cashes out the credit balance (typically by pressing a cash out button to receive a ticket from ticket printer 222). The ticket may be "cashed-in" for money or inserted into another machine to establish a credit balance for play.

Figure 3:
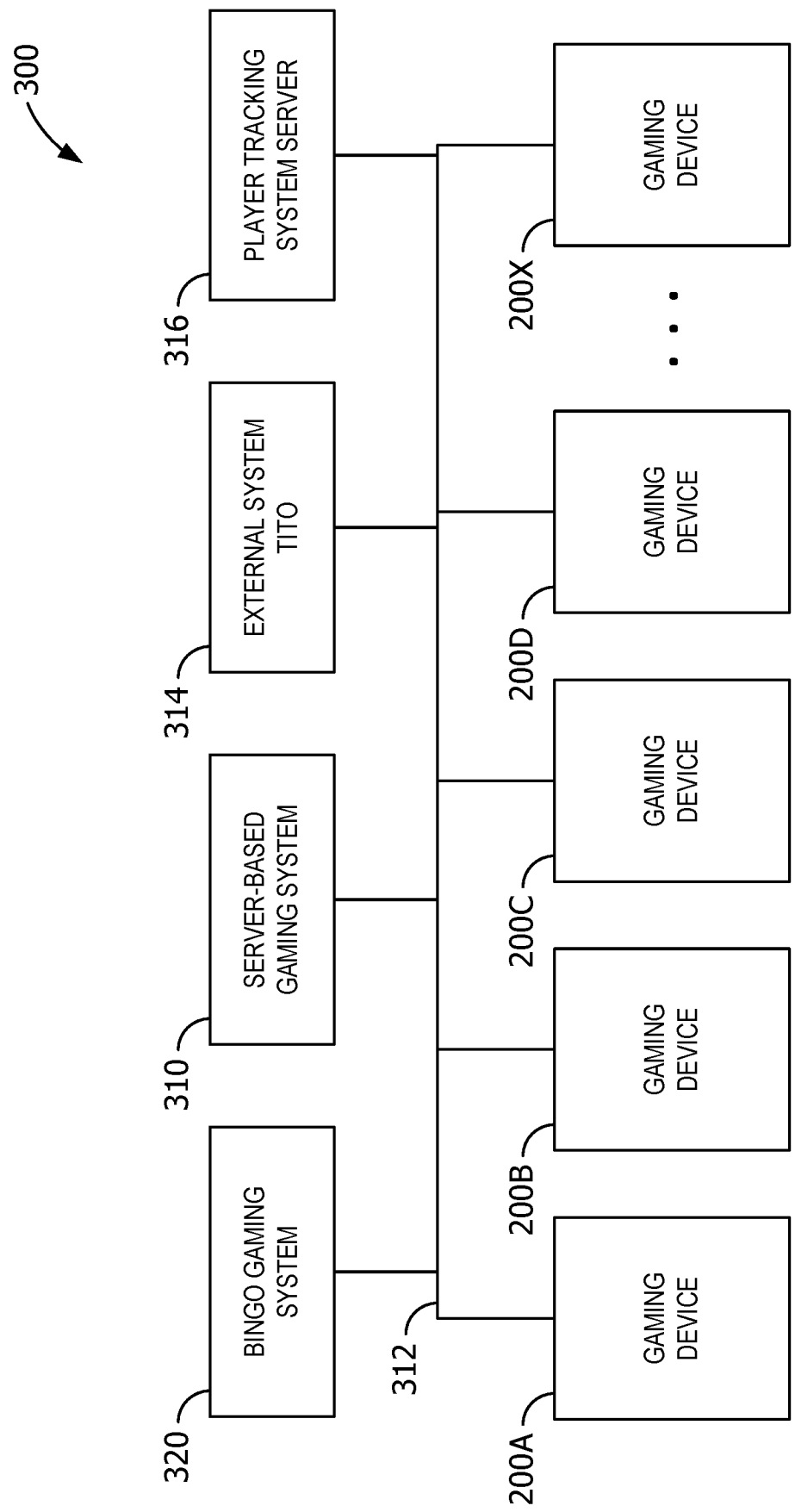
FIG. 3 is a network diagram illustrating a gaming system which is another example of the gaming system of FIG. 1.

FIG. 3 is a network diagram illustrating a gaming system 300 which is another example of the gaming system 100 of FIG. 1. The gaming system 300 includes a bingo gaming system 320. A bingo ball call may be generated on bingo gaming system 320. The bingo ball call is then transmitted over a network 312 to any one of the gaming devices 200A-X that utilize the bingo ball call to determine a game outcome and display the result to the player. In various examples, such as in a class II game, the bingo ball call may be transmitted over network 312 to the appropriate gaming device 200A-X for determination of a bingo game outcome and providing a bingo game award, the bingo game award presented to the player via a simulated game (e.g., a spinning reel game, keno, blackjack, etc.). For example, the gaming device 200A-X may receive the bingo ball call, determine a bingo game award comparing the bingo ball call against a bingo card, and generate a simulated game having results corresponding to the bingo game award.

Figure 4:
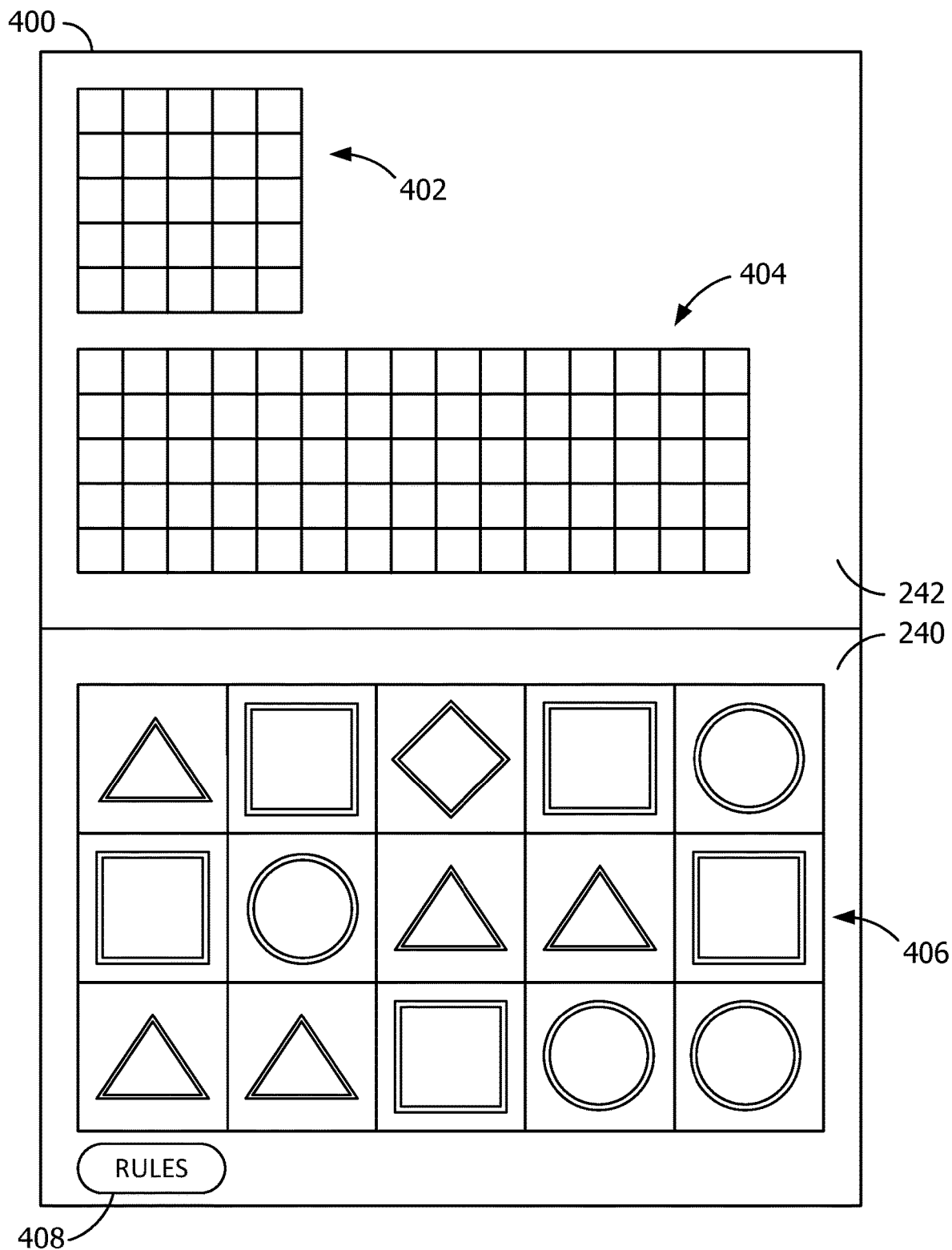
FIG. 4 illustrates a graphical display of a main bingo game presented to the player on the primary game display, and optionally the secondary game display, of the gaming device by the gaming system during a wagering game (e.g., a Class II bingo game)

FIG. 4 illustrates a graphical display 400 of a main bingo game presented to the player on the primary game display 240, and optionally the secondary game display 242, of the gaming device 200 by the gaming system 300 during a wagering game (e.g., a Class II bingo game). In the example embodiment, graphical display 400 includes a bingo card 402 and a ball call 404 in the secondary game display 242 and a spinning reel game façade 406 on the primary game display 240. In some embodiments, displays 240 and 242 may be touch screen displays such as to allow user input and interaction with elements of graphical display 400 as described herein. In the example embodiment, the main bingo game is presented on two displays (e.g., displays 240 and 242). However, it should be understood that any of the elements of graphical display 400 or otherwise described herein may be provided on a single display, or on the other of the displays 240, 242.

Referring now to FIGS. 3 and 4, the main bingo game may be a networked game (e.g., via network 312), in which two or more gaming machines 200 and associated players participate in the same bingo game (e.g., administered by bingo gaming system 320). One or more networked gaming servers (e.g., bingo gaming system 320) may be in communication with the participating gaming machines 200. Each gaming machine may receive a main bingo card (e.g., bingo card 402) and a list (and/or set) of bingo numbers (sometimes referred to herein as "ball call" or "ball draw," e.g., ball call 404) from the one or more networked gaming servers. Alternatively, the bingo card 402 may be provided by the gaming machine. The main bingo card 402 may be received in response to one or more bingo game wagers. In some examples, more than one main bingo card 402 (e.g. 2, 3, 4, 5, etc., bingo cards) may be received in response to a single bingo game wager.

Before, after, or at the same time as receiving the main bingo card(s) 402, the gaming machine may receive ball call 404. In an exemplary example, the ball call 404 may simulate a bingo ball draw (e.g., a list of integers), and may range from one to seventy five numbers (e.g., up to 75 balls ranging in value between 1 and 75). In some examples, the list may comprise more or less than seventy-five numbers. The ball call 404 may be continually generated until an upper limit (e.g., 75 total numbers) is reached. The ball call 404 may be generated independent of any single wager, so long as the upper limit has not been reached, a sufficient number of players are participating in the main bingo game, and no game ending win has been achieved by any of the participating players. The numbers of the ball call 404 may be received successively (e.g., one after another, with some time in between), or all at once.

The ball call 404 may be compared to numbers in the cells of the main bingo card(s) 402 to identify matching numbers. In some examples, the matching numbers may be visually distinguished from non-matching numbers in the main bingo card(s) 402 and/or the number listing by a different color, highlighting, or any suitable visual distinction. New main bingo cards 402 may be generated in response to new bingo game wagers. A new ball call 404 may be generated in response to game ending wins, as discussed below.

One or more main bingo game outcomes may be determined by the gaming machines 200 (or bingo gaming systems 320) based on comparisons between the ball call 404 and the numbered cells of the main bingo card 402. The gaming machines 200 (and/or bingo gaming systems 320) may determine if the main bingo card 402 contains any winning bingo combinations (or "patterns," not shown in FIG. 4) based on comparisons between the ball call 404 and the numbered cells of the main bingo card 402. A winning bingo pattern includes a particular predefined pattern of bingo card cells (e.g., particular cells of main bingo card 402) having numbers that match numbers in the ball call 404 and within a predefined quantity of numbers called (e.g. within the first 10, 20, 30, 40, etc. numbers called in the ball call 404). Further, each main bingo game may have one or more game ending winning bingo patterns and/or one or more interim winning bingo patterns. A game ending winning bingo pattern may comprise a particular bingo pattern associated with a game ending main bingo game winning outcome that ends the main bingo game (e.g., all cells of the main bingo card 402 having numbers that match numbers in the bingo list of numbers). An interim winning bingo pattern may comprise one or more other interim winning bingo patterns associated with one or more interim main bingo game winning outcomes. Interim winning bingo patterns and/or interim main bingo game winning outcomes may occur during the main bingo game without ending the main bingo game. A new listing of bingo numbers may be generated after a game ending main bingo game winning outcome occurs, thereby initiating another (new) main bingo game.

In some examples, interim winning bingo patterns may include traditional bingo patterns such as, for example, a completed horizontal cell row of the bingo card 402, a completed vertical cell column of the bingo card 402, a completed diagonal cell row of the bingo card 402, four cell corners of the bingo card 402, and/or all the cells of the bingo card 402. In an exemplary embodiment, interim winning bingo patterns may comprise less traditional patterns such as, for example, a particular pattern that may be easily recognized by a player, or a seemingly randomly generated subset of cells disposed in no easily discernible arrangement. A winning main bingo game outcome may be determined for the player if there are one or more interim or game ending winning bingo patterns on the main bingo card 402. Further, different winning patterns may be associated with different rewards of the winning main bingo game outcome. In some examples, the reward for a winning main bingo game outcome may be based on an amount wagered ("game wager"), a main bingo game pay table (not shown in FIG. 4), a set of rules for the main bingo game, a probability of achieving a particular bingo pattern, an amount (e.g., a maximum number) of bingo numbers needed to achieve the particular bingo pattern, or other considerations. Rewards associated with main bingo game winning outcomes or winning bingo patterns may be outlined in the pay table. The main bingo game outcome may be a losing outcome for a player if that player does not achieve any winning patterns.

The main bingo game outcome(s) may be simulated to the player in the spinning reel game façade (or just reel game 406) with one or more reel game outcomes. The winning or losing main bingo game outcomes may be presented to the players via the reel game 406, which may simulate one or more reel game outcomes equal to the appropriate main bingo game outcome. For example, if the main bingo game outcome for gaming machine 200 is a losing outcome, the reel game 406 for that gaming machine may simulate one or more similarly losing reel game outcomes. If the main bingo game outcome for gaming machine 200 is a winning outcome, the reel game 406 for that gaming machine 200 may simulate one or more reel game winning outcomes. In an exemplary embodiment, the reward for the one or more simulated winning reel game outcomes will be less than or equal to the reward for the main bingo game outcome for a particular gaming machine. In some examples, the available reel simulations may not provide for all possible main bingo game winning outcomes, so a main reel game outcome may be shown with a lesser reward. In such an example, the player may still receive the full reward for the main bingo game winning outcome, with the reward being presented as a combination of a credit reward for the displayed main reel game outcome, plus 'poof' credits. For example, if a player received a main bingo game winning outcome associated with a 17 credit reward, the player might receive a main reel game winning outcome associated with a 15 credit reward, and an additional 2 "poof" credits may also be added to the player's credit meter.

In some examples, the gaming device 200 may simulate the reel game 406 by spinning each reel and then stopping each reel in a particular position to obtain a matrix of symbols. One or more combinations of symbols in the matrix of symbols may be associated with a reel game outcome that is equal to the main bingo game outcome. If the main bingo game outcome is a winning outcome, then the gaming device 200 may spin the reels to obtain a matrix of symbols having one or more combinations of symbols associated with a reel game winning outcome. If the main bingo game outcome is a losing outcome, then the gaming device 200 may spin the reels to obtain a matrix of symbols that is associated with a reel game losing outcome (e.g., having no combinations of symbols associated with a reel game winning outcome). If the symbol matrix has one or more combinations of symbols associated with a reel game winning outcome, those symbols may be highlighted, emphasized, and/or otherwise indicated. If the player obtains a main bingo game winning outcome, the gaming device 200 may provide the main bingo game reward (and/or award, payout, prize, etc.) in the form of a spinning reel game reward that corresponds to the winning symbol combination(s) presented in the reel game 406. In some examples, rewards for each winning symbol combination may be set forth in an associated reel game pay table. If the player obtains a losing bingo outcome, then the reel game outcome will be a losing outcome, and no winning reel game symbol combinations will be presented in the reel game symbol matrix.

In some examples, special symbols may be added to the matrix of symbols of the spinning reel game. In some examples, the special symbols may comprise one or more feature symbols, such as coins, for example. In some examples, the special symbols may comprise one or more wild (and/or wild card) symbols. In various examples, the awarded special symbols may or may not contribute to a winning combination of symbols. In some examples, whether and/or what special symbols are added to the spinning reel game may be based on the outcome of the main bingo game, and/or any main bingo game winning patterns. In some examples, the main bingo game pay table may include one or more special symbol flags associated with one or more main bingo game winning patterns to indicate whether (and/or which) special symbols should be added to the spinning reel game simulation.

In some examples, one or more of the participating gaming machines may provide a second (e.g., feature) bingo game to a player. For example, the feature bingo game may be part of (or all of) the main bingo game reward (and/or corresponding simulated reel game reward) for a particular gaming machine. In exemplary examples, the main bingo game pay table may include one or more feature game flags associated with one or more main bingo game winning patterns to indicate whether a feature game should be included as part of the reward. In exemplary examples, the feature bingo game is presented to a player as a reward for a reel game symbol matrix having a certain number of special feature symbols. For example, the player may obtain a winning bingo outcome with a winning bingo pattern that is associated with a credit reward and a feature game flag in the main bingo pay table. The winning bingo outcome may be subsequently presented in the reel game simulation as a reel game symbol matrix having a certain number of feature symbols (e.g., three or more coin symbols) that correspond to a feature game reward, as well as one or more symbol combinations that correspond to the bingo game credit reward.

The feature bingo game may be partially associated with the main bingo game. For example, the feature bingo game may include a feature bingo game card (not shown), but may use the main bingo game number list. The feature bingo card may have a grid of numbered cells that are different from the grid of numbered cells on the main bingo card 402. In some examples, the feature bingo game may use the original main bingo game card 402 and a different (i.e., second) set of bingo game numbers. The feature bingo game may be associated with a feature pay table that is different from the main pay table associated with the main bingo game. Thus, bingo patterns that might result in a main bingo game winning outcome may result in a feature bingo game losing outcome, and/or vice versa. Further, the rewards for winning outcomes in the feature bingo game may be different than in the main bingo game.

As with the main bingo game, one or more feature bingo game outcomes may be determined by the gaming machines 200 or bingo gaming system 320. The one or more feature bingo game outcomes may be based on comparisons between the ball call 404 and the numbered cells of the feature bingo card. The one or more feature bingo game outcomes may be simulated in a feature reel game façade with one or more feature reel game outcomes. In an exemplary embodiment, the cumulative rewards for the one or more feature reel game outcomes on a particular gaming machine will be less than or equal to the reward for the feature bingo game outcome for that particular gaming machine. In some examples, the available reel simulations may not provide for all possible feature bingo game winning outcomes, so a feature reel game outcome may be shown with a lesser reward. In such an example, the player may still receive the full reward for the feature bingo game winning outcome, with the reward being presented as a combination of a credit reward for the displayed feature reel game outcome, plus 'poof' credits.

In some examples, a gaming machine may prompt a player to make a selection (e.g., a volatility selection) before proceeding with the feature bingo game. The selection may be related to several volatility options for the feature bingo game and/or feature reel games. For example, the player may be prompted to select between several different combinations of free spins and/or wild symbols, which may be implemented during the associated feature reel game simulation. The volatility options may range from a few free spins with a large number of wild symbols to a large number of free spins with few wild symbols. A feature bingo game pay table may be dynamically generated using the selected volatility option, or it may be chosen from a set of predetermined feature bingo game pay tables, in accordance with the selected volatility option. After a feature bingo game outcome is determined using the feature bingo game pay table, the gaming machine may simulate the feature bingo game outcome through a feature reel game. The feature reel game may apply a number of free spins and/or wild symbols corresponding to the selected volatility option. The feature reel game may produce a number of reel game outcomes equal to the selected number of free spins (e.g. one outcome for each free spin). The selected number of wild symbols may equal the number of wild symbols displayed in the spinning reels during the feature reel game simulation.

In exemplary examples, the total reward for all of the feature reel game outcomes accumulated during the free spins may be less than or equal to the reward for the feature bingo game. As with the main bingo game, rewards for a winning feature bingo game outcome may be based on an amount initially wagered (e.g., bingo game wager), a probability of achieving a particular bingo pattern, a feature bingo game pay table, an associated set of rules for the feature bingo game, an amount of bingo numbers needed to achieve the particular bingo pattern, or other considerations. Rewards associated with feature bingo game winning outcomes (and/or winning bingo patterns) may be outlined in the feature bingo game pay table. The feature bingo game pay table may be different from the main bingo game pay table, and may be dynamically generated based on the player's volatility selection (e.g., selected number of free spins and/or wild card symbols).

Rewards may include a credit payout associated with a monetary value. A credit tally may be updated based on the credit payout. In some examples, the reward may come in the form of a payout that increases a credit balance and/or credit meter of the player on the gaming machine.

In some embodiments, the player may engage the pattern search functionality described herein by, for example, selecting the main bingo card 402 (e.g., after a winning outcome). Such an action may invoke a search for each of the winning patterns experienced by the player during the present game. In some embodiments, the player may engage the pattern search functionality described herein by pressing a rules button 408. In some embodiments, the player may engage the pattern search functionality by pressing an on-screen icon representing a winning pattern recently experienced by the player. Such an action may invoke a search for that one winning pattern.

Figure 5:
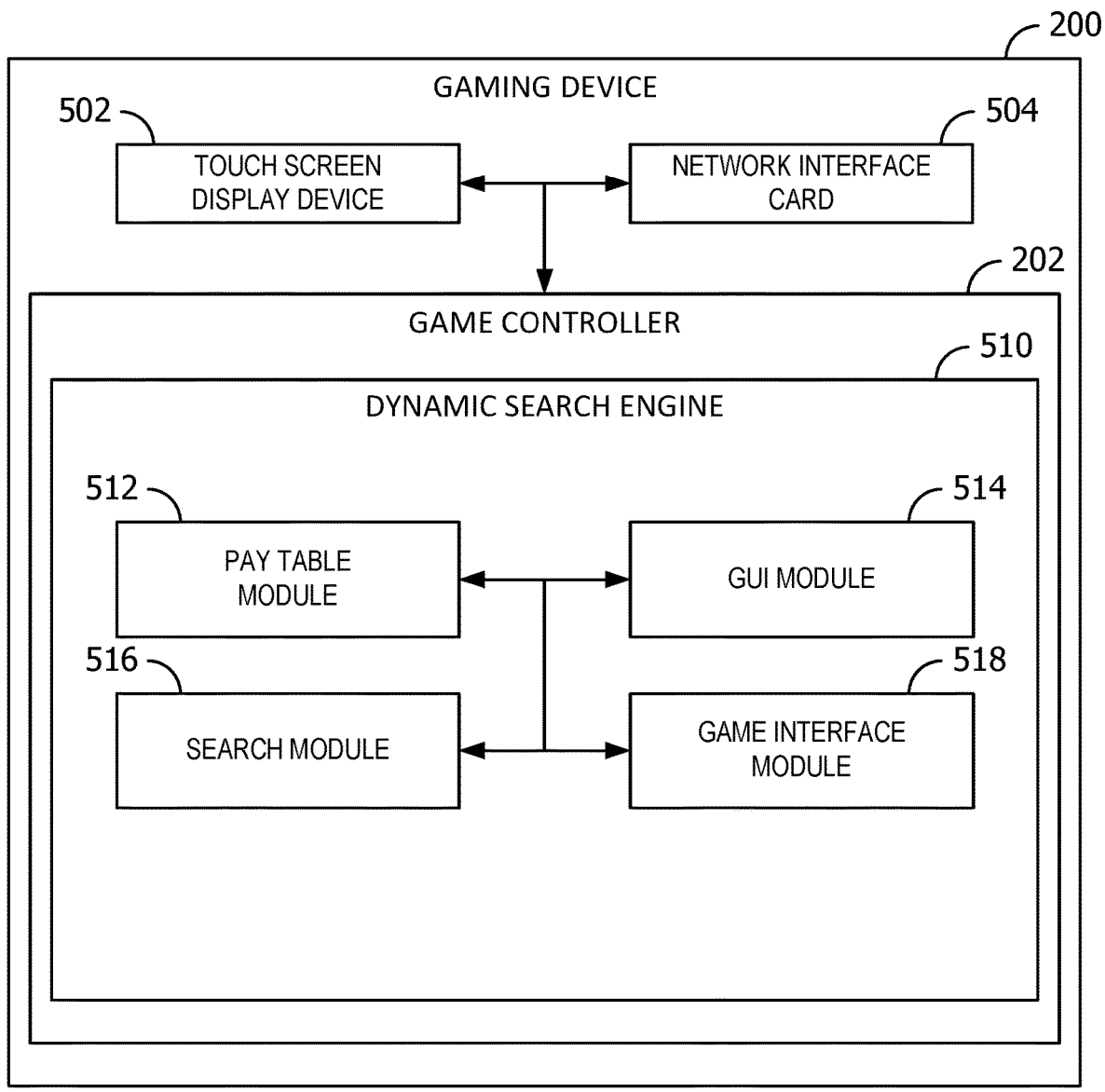
FIG. 5 is a component diagram of a dynamic search engine operating in conjunction with the game controller of gaming device to provide dynamic search functionality during a wagering game.

FIG. 5 is a component diagram of a dynamic search engine 510 operating in conjunction with the game controller 202 of gaming device 200 to provide dynamic search functionality during a wagering game. The dynamic search engine, in the example embodiment, includes a pay table module 512, a GUI module 514, a search module 516, and a game interface module 518. Further, in some embodiments, gaming device 200 includes one or more touch screen display devices 502 configured to accept input from the player (e.g., press, press and hold, press and drag operations) and a network interface card 504 configured to communicate with bingo gaming system 320 over network 312. Touch screen display devices 502 may be similar to, and used as, either or both of primary game display 240 and secondary game display 242.

In the example embodiment, pay table module 512 performs various operations associated with the pay table of the wagering game. The pay table, in the example embodiment, defines multiple win patterns for the wagering game and associated information for each pattern, such as, for example, a pattern map (e.g., data identifying the pattern), a maximum number of balls needed to achieve the win pattern, and credit award information for achieving the win pattern, and a pattern number (e.g., a unique number identifying this particular pattern and associated information). In one example embodiment, the pay table is configured as an XML file that includes an element for each of the multiple win patterns, with sub-elements defining aspects of that win pattern. The pay table file may also include various configuration elements that define, for example, aspects of how the pay table is to be used, configuration options, version number, and so forth.

The following is a portion of an example XML-formatted pay table file for a Class II wagering game:

```
<Paytables>
  <Paytable baseBet="68" betMultiplier="2" minCredits="136">
    <MatchingPatterns>
      ...
      <MatchingPattern ID="1451" BallQty="40" Payout="7560" Index="14">
      </MatchingPattern>
      ...
    </MatchingPatterns>
  </Paytable>
</Paytables>
<Bingo>
```

```
<Mode>Column</Mode>
<EvaluationType>HighestPriorityPaid</EvaluationType>
<Patterns Version="1.0.0.0">
    <Pattern ID="1451">
        <Name>Pattern # 1451</Name>
        <Width>5</Width>
        <Height>5</Height>
        <PatternMap>1110011110112110111110111</PatternMap>
    </Pattern>
    ...
</Patterns>
</Bingo>
```

The example pay table file includes a <Paytables> element and a <Bingo> element. The <Paytables> element defines one or more <Paytable> elements, each corresponding to a possible credit wager combination. Within each <Paytable>, a <MatchingPatterns> element contains multiple <MatchingPattern> elements, one for each bingo win pattern applicable to this particular wager combination. Each <MatchingPattern> includes an ID (identifying a pattern ID for this pattern), a BallQty (identifying a number of balls under which this pattern is considered a winning pattern), a Payout (identifying a win amount for this pattern), and an Index (a unique index number for this <MatchingPattern> within <MatchingPatterns>). In the example embodiment, the ID is used to cross-reference one or more <Pattern>'s provided within the <Bingo> element, as described below.

The <Patterns> element of <Bingo>, in the example embodiment, defines the set of patterns used by the wagering game. More specifically, each individual pattern has a <Pattern> element defining a unique ID (e.g., "1451") as well as several sub-elements (e.g., Name, Width, Height, and PatternMap). <Name> defines a name or moniker for the pattern (e.g., "Four Corners", "Corporal Stripes", or, in this example, just "Pattern #1451"). <Width> and <Height> define the dimensions of the bingo card (e.g., 5 by 5). <PatternMap> (or "pattern map") includes an ordered sequence of characters (e.g., numbers 0, 1, or 2) that defines the winning pattern. Each of the characters of the pattern map corresponds to a cell of a bingo card (e.g., bingo card 402), where "0" indicates that the corresponding cell is not daubed, "1" indicates that the corresponding cell is daubed, and "2" indicates the center cell (which is always considered daubed, and is thus may be excluded from illustrations of winning patterns). In this example, the pattern map is "1110011110112110111110111", and the pattern map is interpreted in a column-incrementing approach, as defined by "<Mode>Column</Mode>" (e.g., starting from top-left, traversing each column left to right, then moving down a row, and so forth). During operation, the <Pattern>'s of the <Bingo> element may be cross-referenced with <MatchingPattern> elements using ID.

In the example embodiment, pay table module 512 may be configured to receive the pay table file via network interface card 504 from a networked server (e.g., bingo gaming system 320), or from the game controller 202 (e.g., from local storage, or as otherwise received from network 312).

Figure 6:
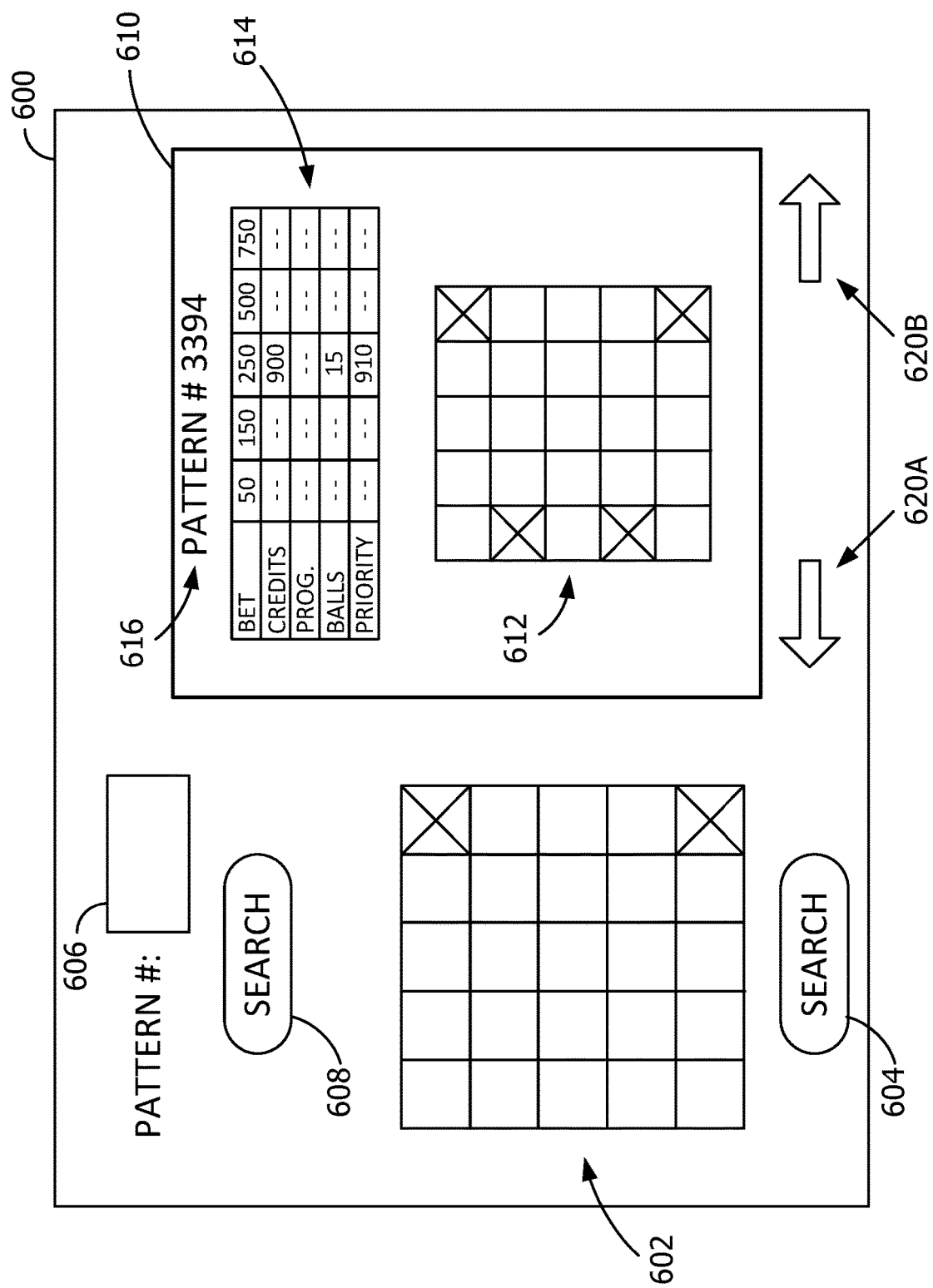
FIG. 6 illustrates an example search interface provided by the dynamic search engine.

GUI module 514, in the example embodiment, is configured to present a search interface (not shown in FIG. 5) to the player during the wagering game and manage associated functionality. The GUI module 514 displays a search card (e.g., a 5×5 bingo card) that allows the player to daub (e.g., mark) cells of the search card and initiate a search (e.g., in conjunction with the search module 516) to find winning patterns that include the daubed cells. The GUI module 514 then presents each of the winning patterns identified by the search and associated data, allowing the player to view the search results and potentially scroll through multiple winning patterns. GUI module 514 may receive touch screen input from the player via the touch screen display devices 502 (e.g., daubing cells, initiating search, scrolling results). FIG. 6 describes the search interface and functionality in greater detail below.

Search module 516 is configured to perform search queries and generate search results. In some embodiments, search module 516 receives a search pattern entered by the player in the search interface. In other embodiments, search module 516 receives a search pattern number from, for example, the player entering the search pattern number in the search interface, or from the player touching the winning pattern or winning pattern number on the display (e.g., after experiencing a winning outcome). Search module 516 uses the search criteria (e.g., search pattern, search pattern number) to identify one or more winning patterns and associated data from the pay table.

Game interface module 518 interfaces with the wagering game to enable the search functionality described herein. Game interface module 518 may receive or otherwise collect game play information from the wagering game (e.g., one or more winning patterns recently experienced by the player which may be used for searching), the pay table being used by the wagering game, and search initiation indicators such as initiation of the search interface (e.g., based on the player touching a help button). In some embodiments, game interface module 518 may expose an application programming interface (API) to the wagering game that allows the wagering game to initiate any of the search functionalities described herein (e.g., initiating a search for a particular set of winning patterns, initiating the search interface, and so forth).

For example, in some embodiments, the gaming device 200 may provide a set of help screens to the player (e.g., by pressing a "help" or "rules" button 408 presented by the wagering game). Some help screens may include static screens that provide playing rules for the wagering game. The help screens may be configured to display all of the winning patterns and associated pay table information, allowing the player to scroll through the winning patterns (e.g., one at a time, or in groups). The help screens may also be configured to allow the player to initiate the search interface (e.g., by pressing a button within the help screens, or by pressing a search initiation button presented by the wagering game). The help screens may interface with the dynamic search engine 510 to dynamically generate winning pattern screens to display within the help screens. For example, the wagering game may initiate an API call to the dynamic search engine 510 requesting a particular winning pattern number, or a range of pattern numbers, or a list of pattern numbers. In some embodiments, the dynamic search engine 510 searches the pay table for the requested patterns and associated information and returns the information to the wagering game for presentation. In other embodiment, the dynamic search engine 510 displays the search interface along with the requested patterns.

FIG. 6 illustrates an example search interface 600 provided by the dynamic search engine 510. In the example embodiment, the dynamic search engine 510 provides the search interface 600 on, for example, primary game display 240 or secondary game display 242. The search interface 600 allows the player to enter search pattern information and view winning pattern information from the pay table of the wagering game. More specifically, search interface 600 includes a search pattern matrix 602 and an associated search button 604, a search pattern number field 606 and an associated search button 608, and a search results display area 610 that, in some embodiments, displays search result information and allows the player to navigate through search results.

The player can initiate a pattern-based search using the search pattern matrix 602 and search button 604. In the example, embodiment, the search pattern matrix 602 is a 5×5 matrix representing a bingo card. The search pattern matrix 602 includes 25 individual cells (not separately numbered) representing each of the spaces of a traditional physical bingo card. For example, the columns may each represent the letters "B", "I", "N", "G", and "O", from left to right, respectively. Further, in the example embodiment, the search pattern matrix 602 is configured to have each cell of the matrix 602 to be touch-active, allowing the player to separately touch (e.g., as a tap gesture) each individual cell and toggle the cell either on or off (e.g., either daubed or not daubed). During operation, the search pattern matrix 602 is used by the player to enter a search pattern for searching by daubing cells to refine the search criteria. The player initiates a pattern-based search (e.g., a search based on the search pattern matrix 602) by touching or clicking the search button 604.

Upon the player initiating a pattern-based search, the dynamic search engine 510 searches the pay table for one or more winning patterns based on the search pattern provided in the search pattern matrix 602. In some embodiments, the dynamic search engine 510 performs an "exact match" search using the search pattern matrix 602. In other words, search results will include only winning patterns from the pay table that have the daubed cells identified in the search pattern matrix 602 and only those daubed cells. In the example embodiment, the dynamic search engine 510 performs an "inclusive match" search using the search pattern matrix 602. An inclusive match search identifies any winning patterns from the pay table that have the same cells daubed as identified in the search pattern matrix 602 but may include other daubed cells not necessarily daubed in the search pattern matrix 602. In other words, each search result will have at least the daubed cells identified by the search pattern matrix 602 and may have additional cells daubed.

For example, and as illustrated in the example shown in FIG. 6, the upper-right corner and the lower-right corner are daubed in the search pattern matrix 602, while all the rest are blank (e.g., undaubed). Upon initiation of a pattern-based search, the dynamic search engine 510, in the example embodiment, converts the search pattern matrix 602 into the pattern map data structure (e.g., <PatternMap>) of the example XML pay table described above. In this example, the search pattern matrix 602 is converted into a search pattern "0000100000002000000000001". In the example embodiment, a string data type is used for the search pattern. However, other data types may be used to represent search patterns, search pattern matrix 602, winning patterns, and such (e.g., an array of 25 integers, 25 bits, and so forth). The dynamic search engine 510 compares the search pattern to the winning patterns included in the pay table file for the wagering game (e.g., within the <Patterns> element of <Bingo>).

The comparison may include a byte-wise comparison between the search pattern and each of the winning patterns (e.g., the <PatternMap> of each <Pattern>) of the pay table. For exact match searches, only those winning patterns exactly matching the search pattern are returned (e.g., an exact match in a string comparison). In some situations, the search results from an exact match search may include multiple winning patterns (e.g., if the same winning pattern is defined within the pay table multiple times). For inclusive match searches, any winning patterns that match on at least those daubed cells of the search pattern (e.g., the non-zero cells) are included in the search results. In some embodiments, the dynamic search engine 510 may compare only the non-zero cells to each winning pattern to identify the search results. For example, bytes 5 and 25 of the example search pattern have been daubed by the player (e.g., PatternMap[4] and PatternMap[24] are both non-zero) and, as such, dynamic search engine 510 may identify all winning patterns in the pay table which have the values of PatternMap [4] and PatternMap[24] as non-zero.

In the example shown in FIG. 6, a search result for "Pattern #3394" is shown in search results display area 610. Search results display area 610 includes a result pattern matrix 612, a result pattern data area 614, and a result pattern identifier 616. The search results display area 610 is configured to display a single result (e.g., a single winning pattern matching the result) at a time, but allowing the player to scroll through the search results using arrows 620. In this example, one of the search results is pattern #3394. In the pay table, pattern #3394 may appear as:

```
<Pattern ID="3394">
    <Name>Pattern # 3394</Name>
    <Width>5</Width>
    <Height>5</Height>
    <PatternMap>0000110000002001000000001</PatternMap>
</Pattern>.
```

In other words, the PatternMap of this example winning pattern has both of the daubed cells identified in matrix 602 (bytes 5 and 25) daubed, and additionally has bytes 6 and 16 also daubed. As such, pattern 3394 matches the search pattern in an inclusive search, but would not match in an exact search. As such, when displaying a particular winning pattern from the search results, dynamic search engine 510 converts the PatternMap of the winning pattern back into the display format shown in FIG. 6 (e.g., as result pattern matrix 612). In other words, dynamic search engine 510 daubs bytes 5, 6, 16, and 25 of result pattern matrix 612. In addition, dynamic search engine 510 also displays additional pay table information for the active search result pattern (e.g., pattern 3394) in result pattern data area 614 such as, for example, bet amounts and associated award information for each bet amount (e.g., credit award, progressive, number of balls called to win, and priority). Such data may be cross-referenced from the <Paytables> element using the ID of the pattern (e.g., ID=3394).

In situations involving multiple winning patterns being identified in a search, dynamic search engine 510 allows the player to scroll through each matching search result using the arrows 620A, 620B. Upon touching arrow 620B, for example, dynamic search engine 510 may display the next search result in search results display area 610, refreshing matrix 612 and result pattern data area 614 based on the next search result.

The player may also search for a specific winning pattern using the search pattern number field 606 and search button 608. For example, the player may enter pattern number "3394" into the search pattern number field 606 and press the search button 608. As such, dynamic search engine 510 searches the pay table based on the pattern number (e.g., based on "ID" defined for each <Pattern>). Upon identifying <Pattern ID="3394"> in the pay table, dynamic search engine 510 populates the result pattern matrix 612, the result pattern data area 614, and the result pattern identifier 616 with the located data, as shown in FIG. 6.

Figure 7:
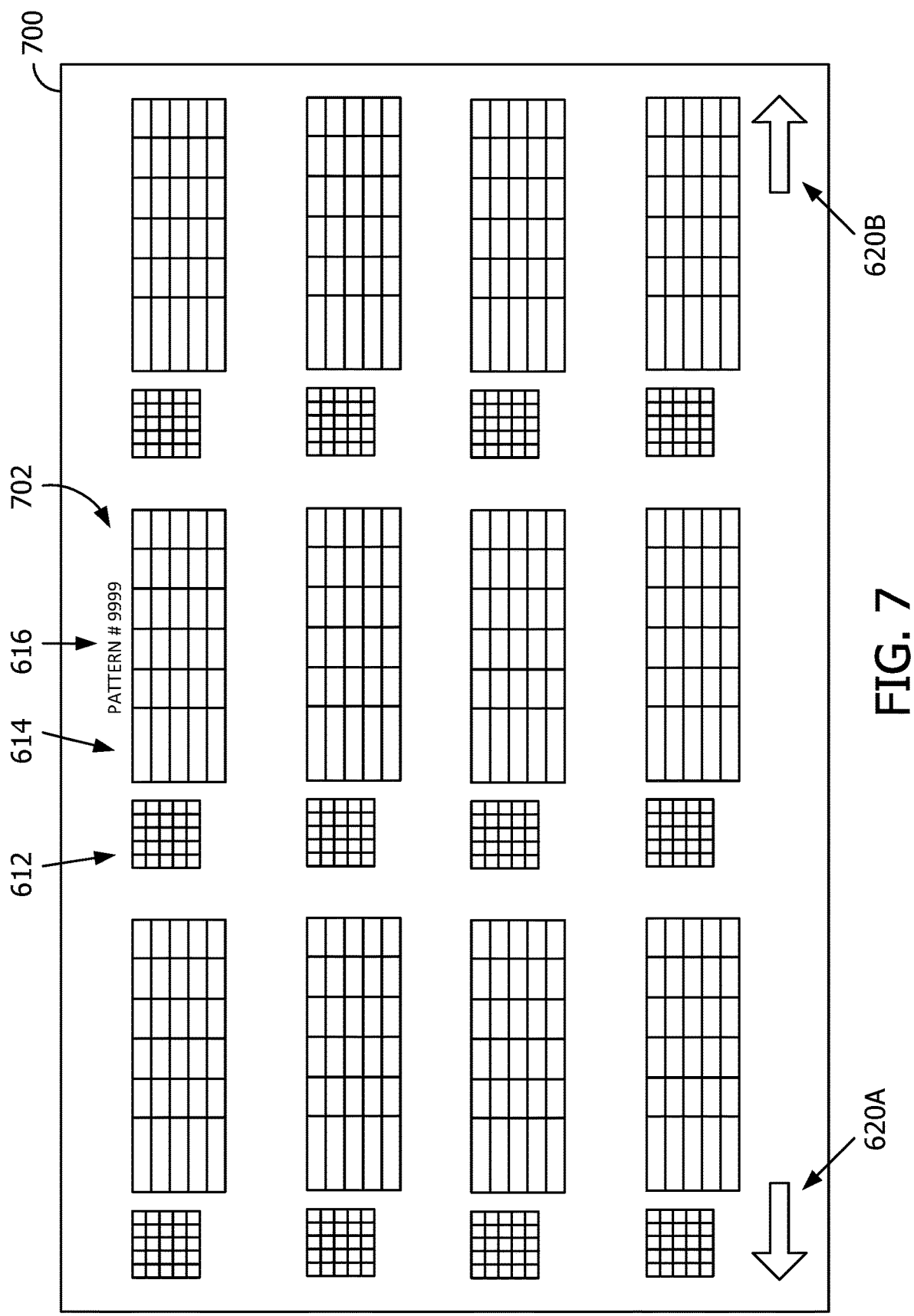
FIG. 7 illustrates another example search results area which may be provided by the dynamic search engine.

FIG. 7 illustrates another example search results area 700 which may be provided by the dynamic search engine 510. In some situations, a pattern search may identify numerous search results. The dynamic search engine 510 may provide the search results in the consolidated format shown in FIG. 7. More specifically, the search results area 700 includes multiple search result entries 702, one for each search result. Each search result entry 702 includes the result pattern matrix 612, result pattern data area 614 and result pattern identifier 616 as described with respect to FIG. 6, but in the compressed format shown in FIG. 7. Further, in the example embodiment, each search result entry 702 is selectable by the player (e.g., via a touch gesture). In response to the touch gesture, the dynamic search engine 510 may present a larger view of the entry 702, such as shown in search results display area 610 of FIG. 6. Search results area 700 may also include buttons 620 for scrolling through additional pages of search result entries 702.

In some embodiments, search results area 700 may provide all of the winning patterns (e.g., as a search for all winning patterns from the pay table). For example, the help screens may initiate a search for all winning patterns from the pay table, and dynamic search engine 510 may provide the search results area 700 to facilitate such viewing.

In some embodiments, the base game or a feature game initiated from the base game, may provide to the player a choice of multiple volatility options for the upcoming game(s). In one example, the base game determines a bingo win for the base game using a pay table associated with the base game, and a feature game is initiated after the base game, and the feature game provides feature game options to the player, each of which may have a different pay table (e.g., different <Paytable>'s than the base game pay table, different as between the other feature game options, and so forth). In other words, and for example, the wagering game may include six distinct pay tables, one for the base game and one for each of five feature game options. Further, in some embodiments, winning patterns may differ between the base game and between the various feature options. In other words, and for example, the wagering game may include six distinct <Patterns>, one for the base game and one for each feature option.

When looking at help screens, the player may wish to search for pay table information for any one of the games, either the base game or any one of the feature game options. Since each of the base game and the feature games may use differing pay table and pattern information, in some embodiments, upon initiating help functionality, the dynamic search engine 510 may present a search scope screen (not shown) that allows the player to select from the base game and any of the feature options to limit the scope of pattern searching. In some embodiments, the search scope screen may allow the player to select one of the game options. In other embodiments, the search scope screen may allow the player to select one or more of the game options (e.g., toggling the particular games of interest for the scope).

Upon selection, by the player, of one or more of the particular games, the dynamic search engine 510 then provides the search functionality as described above (e.g., search interface 600, search results area 700), but limits the scope of the searching based on the player's selection(s). More specifically, the dynamic search engine 501 limits search results to the selected pay table or pattern set associated with the selected game(s). For example, if the player selects the base game and then enters the above example search, the dynamic search engine 510 searches only the <Patterns> associated with the base game and cross-references pay table information only from the <Paytable> associated with the base game. As such, when there are multiple games within the pay table file that have differing sets of patterns or pay tables, the search functionality may be confined to a particular game to allow the player a more focused search.

In some embodiments, a search scope button (not shown) may be provided (e.g., on display interface 600, on search results area 700) that allows the player to alter the scope of which games are searched. For example, the player may press the search scope button to initiate the above-described screen that allows the player to choose from one of the game options, and may select or alter which games they wish to search. After selecting, the player is then returned to the search interface 600 for further searching, and with the newly-updated games as selected by the player.

Figure 8:
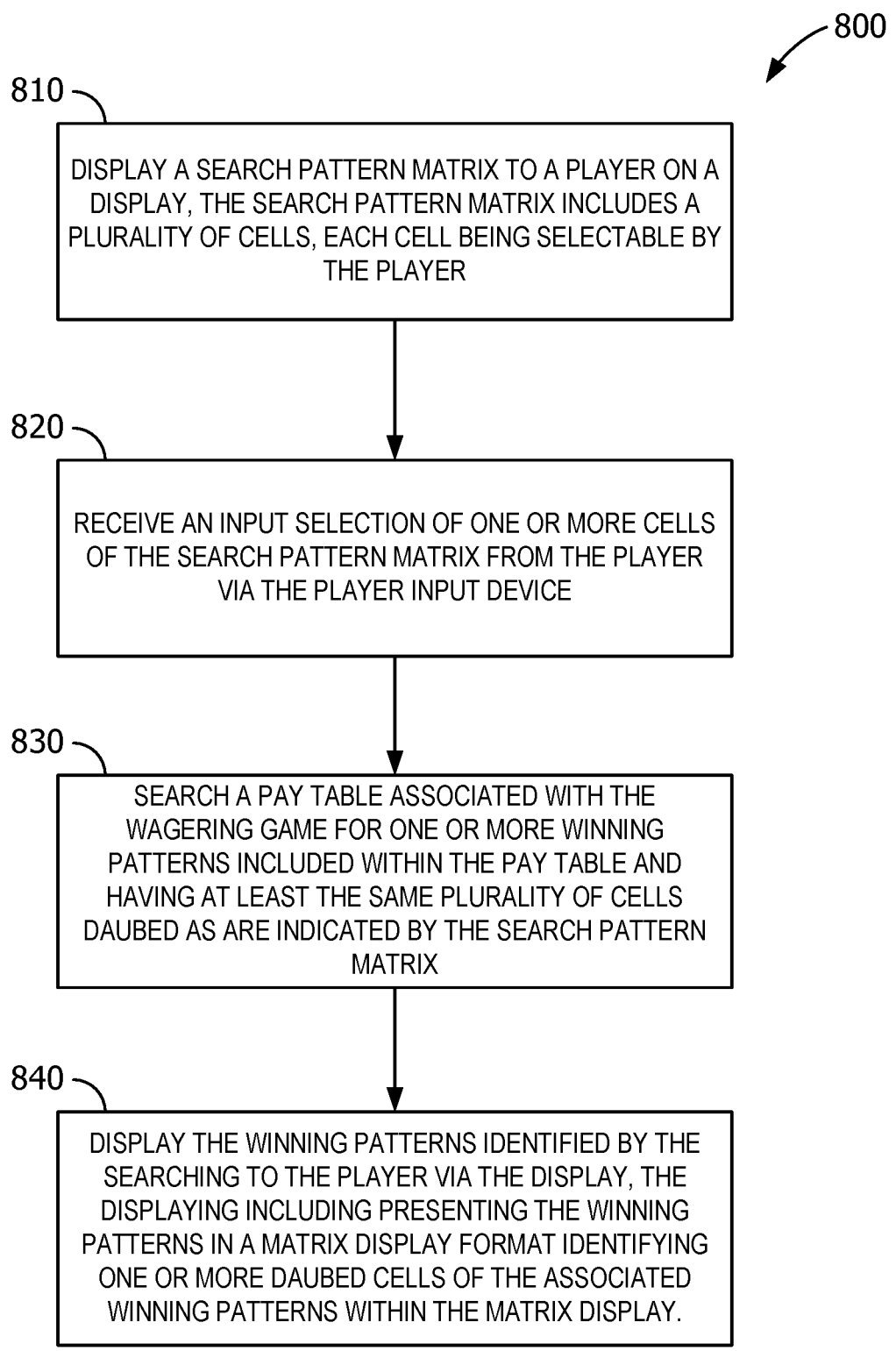
FIG. 8 is a flow chart illustrating an example method for providing search functionality to the player.

FIG. 8 is a flow chart illustrating an example method 800 for providing search functionality to the player. In the example embodiment, the method 800 is performed by the game controller 202. Method 800 include displaying 810 a search pattern matrix to a player on the display, the search pattern matrix includes a plurality of cells, each cell of the plurality of cells being selectable by the player. Method 800 also includes receiving (820) an input selection of one or more cells of the search pattern matrix from the player via the player input device. The method 800 further includes searching (830) a pay table associated with a wagering game provided by the gaming machine for one or more winning patterns included within the pay table and having at least the same plurality of cells daubed as are indicated by the search pattern matrix. The method 800 also includes displaying the one or more winning patterns identified by the searching to the player via the display, the displaying including presenting the one or more winning patterns in a matrix display format identifying one or more daubed cells of the associated winning patterns within the matrix display.

In some embodiments, the search pattern matrix represents a bingo card, wherein the wagering game is a bingo game, wherein each cell of the search pattern matrix represents a square of the bingo card. In some embodiments, the display is a touch screen display that includes the player input device, wherein receiving an input selection includes receiving a touch gesture performed by the player on a first cell of the search pattern matrix and marking the first cell on the search pattern matrix to identify that the first cell is daubed. In some embodiments, displaying the one or more winning patterns identified by the searching further includes displaying pay table information associated with one or more winning patterns from the pay table in conjunction with the associated winning pattern. In some embodiments, displaying the search pattern matrix to the player on the display further includes initiating the displaying of the search pattern matrix based on a user selection of one or more of a rules button and a help button provided by the wagering game.

In some embodiments, the method 800 further includes displaying a plurality of winning patterns identified by the searching simultaneously on the display, the display of each winning pattern of the plurality of winning patterns including at least a matrix display format identifying one or more daubed cells of the associated winning patterns within the matrix display, wherein each winning pattern within the display of the plurality of winning patterns is selectable by the player to present a large format display of the selected winning pattern. In some embodiments, the method 800 further includes displaying a pattern number input box to the player via the display, receiving a search pattern number provided by the player via the pattern number input box, searching the pay table for a winning pattern having the search pattern number, and displaying the winning pattern to the player via the display.

A computer, controller, or server, such as those described herein, includes at least one processor or processing unit and a system memory. The computer, controller, or server typically has at least some form of computer readable non-transitory media. As used herein, the terms "processor" and "computer" and related terms, e.g., "processing device", "computing device", and "controller" are not limited to just those integrated circuits referred to in the art as a computer, but broadly refers to a microcontroller, a microcomputer, a programmable logic controller (PLC), an application specific integrated circuit, and other programmable circuits "configured to" carry out programmable instructions, and these terms are used interchangeably herein. In the embodiments described herein, memory may include, but is not limited to, a computer-readable medium or computer storage media, volatile and nonvolatile media, removable and non-removable media implemented in any method or technology for storage of information such as computer readable instructions, data structures, program modules, or other data. Such memory includes a random access memory (RAM), computer storage media, communication media, and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As indicated above, the process may be embodied in computer software. The computer software could be supplied in a number of ways, for example on a tangible, non-transitory, computer readable storage medium, such as on any nonvolatile memory device (e.g. an EEPROM). Further, different parts of the computer software can be executed by different devices, such as, for example, in a client-server relationship. Persons skilled in the art will appreciate that computer software provides a series of instructions executable by the processor.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming machine comprising:
a display device;
an input device;
a storage medium having instructions stored thereon; and
a game controller configured to execute the instructions stored in the storage medium, which, when executed by the game controller, cause the game controller to at least:
 display, on the display device, a help screen graphical user interface (GUI) of a help function associated with a game on the display device, the help screen GUI including a search pattern matrix having a plurality of selectable cells;
 receive, within the help screen GUI, an input selection of one or more selected cells of the search pattern matrix via the input device;
 dynamically construct at least one help screen based on the input selection, each help screen of the at least one help screen including a plurality of potential winning patterns; and
 display, within the help screen GUI, the at least one help screen, thereby visually representing an indication of what the game could award if at least one potential winning pattern of the plurality of potential winning patterns is achieved.

2. The electronic gaming machine of claim 1, wherein each potential winning pattern of the plurality of potential winning patterns on each help screen of the at least one help screen includes (i) a visual representation of a potential winning pattern of the plurality of potential winning patterns and (ii) pay table data indicating win amounts associated with that potential winning pattern.

3. The electronic gaming machine of claim 1, wherein each potential winning pattern of the plurality of potential winning patterns included on the at least one help screen are selectable.

4. The electronic gaming machine of claim 3, the instructions further cause the game controller to:
receive a touch gesture performed on a first selected winning pattern of the plurality of potential winning patterns; and
display an individual help screen showing an enlarged visual representation of the first selected winning pattern and pay table data associated with the first selected winning pattern.

5. The electronic gaming machine of claim 3, wherein the display device is a touch screen display device that includes the input device, wherein receiving the input selection includes:
receiving a touch gesture performed on a first selected cell of the search pattern matrix; and
marking the first selected cell on the search pattern matrix to identify that the first selected cell is selected.

6. The electronic gaming machine of claim 1, wherein a first help screen of the at least one help screen includes (i) a dynamically built visual representation of the at least one potential winning pattern of the plurality of potential winning patterns constructed based on a pattern map of the at least one potential winning pattern included within a pay table and (ii) pay table data indicating win amounts associated with the at least one potential winning pattern.

7. The electronic gaming machine of claim 1, the instructions further cause the game controller to at least:
display a pattern number input box;
receive a search pattern number via the pattern number input box;
search a pay table for a winning pattern having the search pattern number;
dynamically construct a first help screen of the at least one help screen based on a search result using the search pattern number; and
display the first help screen within the help screen GUI.

8. A method of electronic gaming implemented on an electronic gaming machine, the electronic gaming machine including at least one processor in communication with at least one memory device, an input device, and a display device, the method comprising:
displaying, on the display device, a help screen graphical user interface (GUI) of a help function associated with a game on the display device, the help screen GUI including a search pattern matrix having a plurality of selectable cells;

receiving, within the help screen GUI, an input selection of one or more selected cells of the search pattern matrix via the input device;

dynamically constructing at least one help screen based on the input selection, each help screen of the at least one help screen including a plurality of potential winning patterns; and displaying, within the help screen GUI, the at least one help screen, thereby visually representing an indication of what the game could award if at least one potential winning pattern of the plurality of potential winning patterns is achieved.

9. The method of claim 8, wherein each potential winning pattern of the plurality of potential winning patterns on each help screen of the at least one help screen includes (i) a visual representation of a potential winning pattern of the plurality of potential winning patterns and (ii) pay table data indicating win amounts associated with that potential winning pattern.

10. The method of claim 8, wherein each potential winning pattern of the plurality of potential winning patterns included on the at least one help screen are selectable.

11. The method of claim 10, further comprising:
receiving a touch gesture performed on a first selected winning pattern of the plurality of potential winning patterns; and
displaying an individual help screen showing an enlarged visual representation of the first selected winning pattern and pay table data associated with the first selected winning pattern.

12. The method of claim 10, wherein the display device is a touch screen display device that includes the input device, wherein receiving the input selection includes:
receiving a touch gesture performed on a first selected cell of the search pattern matrix; and
marking the first selected cell on the search pattern matrix to identify that the first selected cell is selected.

13. The method of claim 8, wherein a first help screen of the at least one help screen includes (i) a dynamically built visual representation of the at least one potential winning pattern of the plurality of potential winning patterns constructed based on a pattern map of the at least one potential winning pattern included within a pay table and (ii) pay table data indicating win amounts associated with the at least one potential winning pattern.

14. The method of claim 8, further comprising:
displaying a pattern number input box;
receiving a search pattern number via the pattern number input box;
searching a pay table for a winning pattern having the search pattern number;
dynamically construct a first help screen based on a search result using the search pattern number; and
displaying the first help screen within the help screen GUI.

15. A non-transitory computer-readable storage medium having computer-executable instructions embodied thereon, wherein when executed by an electronic gaming machine having at least one processor coupled to an input device, a display device, and at least one memory device, the computer-executable instructions cause the at least one processor to:

display, on the display device, a help screen graphical user interface (GUI) of a help function associated with a game on the display device, the help screen GUI including a search pattern matrix having a plurality of selectable cells;

receive, within the help screen GUI, an input selection of one or more selected cells of the search pattern matrix via the input device;

dynamically construct at least one help screen based on the input selection, each help screen of the at least one help screen including a plurality of potential winning patterns; and display, within the help screen GUI, the at least one help screen, thereby visually representing an indication of what the game could award if at least one potential winning pattern of the plurality of potential winning patterns is achieved.

16. The non-transitory computer-readable storage medium of claim 15, wherein each potential winning pattern of the plurality of potential winning patterns on each help screen of the at least one help screen includes (i) a visual representation of a potential winning pattern of the plurality of potential winning patterns and (ii) pay table data indicating win amounts associated with that potential winning pattern.

17. The non-transitory computer-readable storage medium of claim 15, wherein each potential winning pattern of the plurality of potential winning patterns included on the at least one help screen are selectable.

18. The non-transitory computer-readable storage medium of claim 17, wherein the computer-executable instructions cause the at least one processor to:
receive a touch gesture performed on a first selected winning pattern of the plurality of potential winning patterns; and
display an individual help screen showing an enlarged visual representation of the first selected winning pattern and pay table data associated with the first selected winning pattern.

19. The non-transitory computer-readable storage medium of claim 17, wherein the display device is a touch screen display device that includes the input device, wherein receiving the input selection includes:
receiving a touch gesture performed on a first selected cell of the search pattern matrix; and
marking the first selected cell on the search pattern matrix to identify that the first selected cell is selected.

20. The non-transitory computer-readable storage medium of claim 15, wherein a first help screen of the at least one help screen includes (i) a dynamically built visual representation of the plurality of potential winning patterns based on a pattern map of the at least one potential winning pattern included within a pay table and (ii) pay table data indicating win amounts associated with the at least one potential winning pattern.

* * * * *